United States Patent
Ding et al.

(10) Patent No.: US 6,740,728 B2
(45) Date of Patent: May 25, 2004

(54) METHODS FOR THE PREPARATION OF POLYESTERS, POLY(ESTER AMIDE)S AND POLY(ESTER IMIDE)S AND USES OF THE MATERIALS OBTAINED THEREFROM

(75) Inventors: Yong Ding, Norwood, MA (US); Benjamin Bikson, Brookline, MA (US)

(73) Assignee: Praxair Technology, Inc., Danbury, CT (US)

( * ) Notice: Subject to any disclaimer, the term of this patent is extended or adjusted under 35 U.S.C. 154(b) by 51 days.

(21) Appl. No.: 10/153,703

(22) Filed: May 24, 2002

(65) Prior Publication Data
US 2003/0233933 A1 Dec. 25, 2003

(51) Int. Cl.[7] .............................................. C08G 75/00
(52) U.S. Cl. ........................ 528/174; 528/171; 528/172; 528/199; 528/201; 528/204; 528/211; 528/219; 528/370; 528/401; 528/422; 524/706; 524/710; 524/730
(58) Field of Search ................................. 528/171, 172, 528/174, 199, 201, 204, 211, 219, 370, 373, 401, 422; 524/706, 710, 730; 210/640, 730

(56) References Cited

U.S. PATENT DOCUMENTS

| | | | |
|---|---|---|---|
| 3,440,218 A | 4/1969 | Caldwell | 260/47 |
| 3,859,251 A | 1/1975 | Kuhfuss et al. | 260/47 |
| 4,066,622 A | 1/1978 | Feinstein et al. | 260/47 |
| 4,075,179 A | 2/1978 | Karkoski et al. | 260/75 N |
| 4,387,210 A | 6/1983 | Katoh et al. | 528/179 |
| 4,631,333 A | 12/1986 | Kricheldorf et al. | 528/170 |
| RE33,315 E | 8/1990 | Hisgen et al. | 528/170 |
| 5,025,082 A | 6/1991 | Kishiro et al. | 528/190 |
| 5,049,295 A | 9/1991 | Takemura et al. | 252/62.54 |
| 5,243,017 A | 9/1993 | Pedretti et al. | 528/193 |
| 5,254,795 A * | 10/1993 | Boucher et al. | 585/819 |
| 5,290,452 A * | 3/1994 | Schucker | 210/640 |
| 5,310,943 A | 5/1994 | Blyakhman | 549/242 |
| 5,382,649 A | 1/1995 | Horacek | 528/170 |

OTHER PUBLICATIONS

Higashi et al., "High–Molecular–Weight Copolyesters of Dihydroxybenzophenones by 'Induced', Copolyesterification Using TsCl/DMF/Py as a Condensing Agent" *Journal of Polymer Science*:Part A: Polymer Chemistry, vol. 37, 3625–3631 (1999).

Tullos et al., "Soluble Poly(amide–imide)s Prepared by One–Pot Solution Condensation", *Journal of Polymer Science: Part A:Polymer Chemistry*, vol. 37, 1183–1188 (1999).

D.F. Loncrini, "Aromatic Polyesterimides", *Journal of Polymer Science*: Part A–1, vol. 1, 1531–1541 (1966).

\* cited by examiner

*Primary Examiner*—Samuel A. Acquah
(74) *Attorney, Agent, or Firm*—David M. Rosenblum

(57) ABSTRACT

The present invention relates to methods for the preparation of polyesters, poly(ester amide)s and poly(ester imide)s. The materials obtained by the methods of present invention are useful as fluid separation membranes and as high performance materials.

19 Claims, 3 Drawing Sheets

METHODS FOR THE PREPARATION OF POLYESTERS, POLY(ESTER AMIDE)S AND POLY(ESTER IMIDE)S AND USES OF THE MATERIALS OBTAINED THEREFROM

FIELD OF INVENTION

The present invention relates to methods for the preparation of polyesters, poly(ester amide)s and poly(ester imide)s. The materials obtained by the methods of present invention are useful as fluid separation membranes and as high performance materials.

BACKGROUND OF THE INVENTION

Polymers containing the ester linkage, such as polyesters, poly(ester amide)s, and poly(ester imide)s have been extensively studied and used in variety of applications. General information about the polymers containing the ester linkages can be found in the following and other monographs and reviews: P. E. Cassidy, "Thermally Stable Polymers", Marcel Dekker, 1980.

R. A. Gaudiana, et al., "Progress in Polymer Science", Volume 14, page 47–89, 1989. H. R. Kricheldorf, "Handbook of Polymer Synthesis", Marcel Dekker, 1992.

F. Millich, C. E. Carraher, Jr., "Interfacial Synthesis", Marcel Dekker, 1977.

Interfacial polymerization and high temperature melt polymerization methods are two commonly used methods for the preparation of polyesters. Although both methods provide sufficient high molecular weight polyesters, the interfacial polymerization method uses large amount of chlorinated solvents and melt polymerization method uses very high polymerization temperature (under the conditions of pyrolysis). The direct polymerization between aromatic dicarboxylic acids and diols was reported by Higashi et al in "Journal of Polymer Science, Polymer Chemistry Edition", Volume 23, page 1361, 1985. The method used pyridine as the polymerization media and the polymerization temperature needed to be higher than 100° C.

The low temperature solution polymerization method between an aromatic dicarboxylic chloride and a diol is well known in the art but it affords only low molecular weight oligomers, see for example, H. Jeong et al. in "Journal of Polymer Science, Polymer Chemistry Edition", Volume 32, page 1057, 1994; Y.-T. Chern, in "Macromolecules", Volume 28, page 5561, 1995; and M. Bruma, et al. in "Journal of Macromolecular Science, Review of Macromolecular Chemistry and Physics", Volume C36, page 119, 1996.

U.S. Pat. No. 4,387,210 disclosed the synthesis of selected poly(etser amide)s from aminophenols by interfacial polymerization reaction. Due to the significant solubility differences between aromatic diamines and the salts of aromatic diols, the preparation of poly(ester amide)s by interfacial polymerization starting from an aromatic diamine and an aromatic diol is very difficult to practice. U.S. Pat. Nos. 3,859,251, 4,075,179 and 5,243,017 disclosed certain poly(ester amide)s prepared by melt polymerization method at high temperature under vacuum.

The synthesis of poly(ester imide)s is known in the art. For example, U.S. Pat. Nos. 4,631,333; 4,383,105 and 3,542,731 describe processes in which the monomeric trimellitic acid imide is first prepared from trimellitic acid anhydride and aminophenol and then is polymerized under conditions of pyrolysis. U.S. Pat. Nos. 5,349,039 and 5,708,122 describe a processes in which the monomeric imide diacid is first prepared from trimellitic acid anhydride and a dianiline or aminobenzoic acid and then poly(ester imide)s are obtained by polymerization with a bisphenol. Wang and Yang describe the process in which a monomeric ester dianiline is first prepared and then is polymerized with a dianhydride, see, Polymer Preprint, American Chemical Society, Volume 39(2), 1998, page 800. Loncrini describes a process in which a monomeric ester dianhydride is first synthesized and isolated and then is polymerized with a dianiline, see, Journal of Polymer Science, Part A-1, Volume 4, page 1531, 1966. All processes disclosed so far either involve the isolation and purification of the intermediate monomers or use very high polymerization temperature (under the conditions of pyrolysis).

OBJECTS OF THE INVENTION

Accordingly, one object of the present invention is to provide a novel low temperature solution polymerization method for the preparation of polyesters.

Another object of the present invention is to provide a novel low temperature solution polymerization method for the preparation of poly(ester amide)s.

SUMMARY OF THE INVENTION

The invention comprises a novel low temperature solution polymerization method for the preparation of polyesters and poly(ester amide)s.

One embodiment is a novel one-pot process for the preparation of poly(ester imide)s with the general formula I by reacting an anhydride chloride with a diol and a diamine.

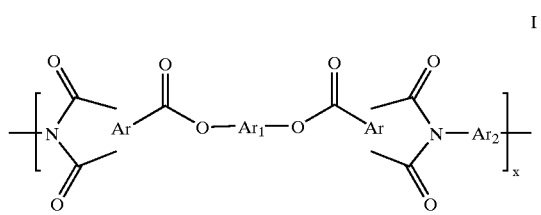

Where x is an integer larger than 10.

Another embodiment of the present invention provides improved catalysts to catalyze the formation of ester linkage in a polymerization reaction.

Another embodiment provides catalysts to catalyze the formation of ester anhydride and the formation of high molecular weight poly(ester imide)s therefrom in one-pot reaction.

Still another embodiment of the present invention provides a process to form novel soluble polyamic acids and derivatives therefrom, in particular polyester amic acid salts.

A further embodiment of the present invention provides novel soluble poly(ester amide)s and poly(ester imide)s derived from the following diols.

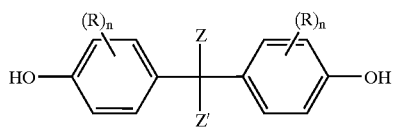

where n=0–2 and R is:

—H, —$CH_3$, —$CH_2CH_3$, —$CH_2CH_2CH_3$, iso-propyl, iso-butyl, tert-butyl, —Br, —Cl, —F, —$NO_2$, —CN,

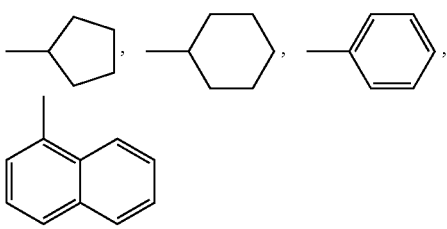

Z and Z' are:

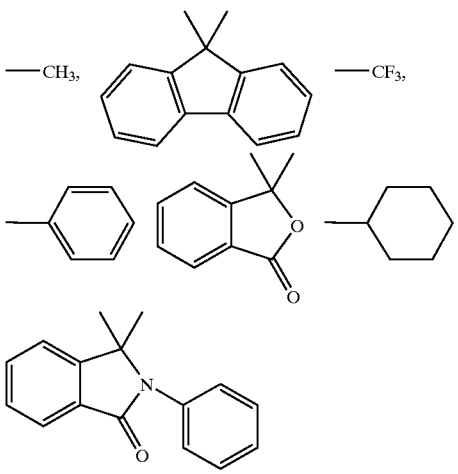

Still a further embodiment of the present invention provides novel poly(ester amide) and poly(ester imide) polymeric fluid separation membrane materials with improved separation characteristics.

BRIEF DESCRIPTION OF THE DRAWINGS

Other objects, features and advantages will occur to those skilled in the art from the following description of (a) preferred embodiment(s) and the accompanying drawing(s), in which.

DETAILED DESCRIPTION OF THE INVENTION

1. Polyesters

Figure 1:
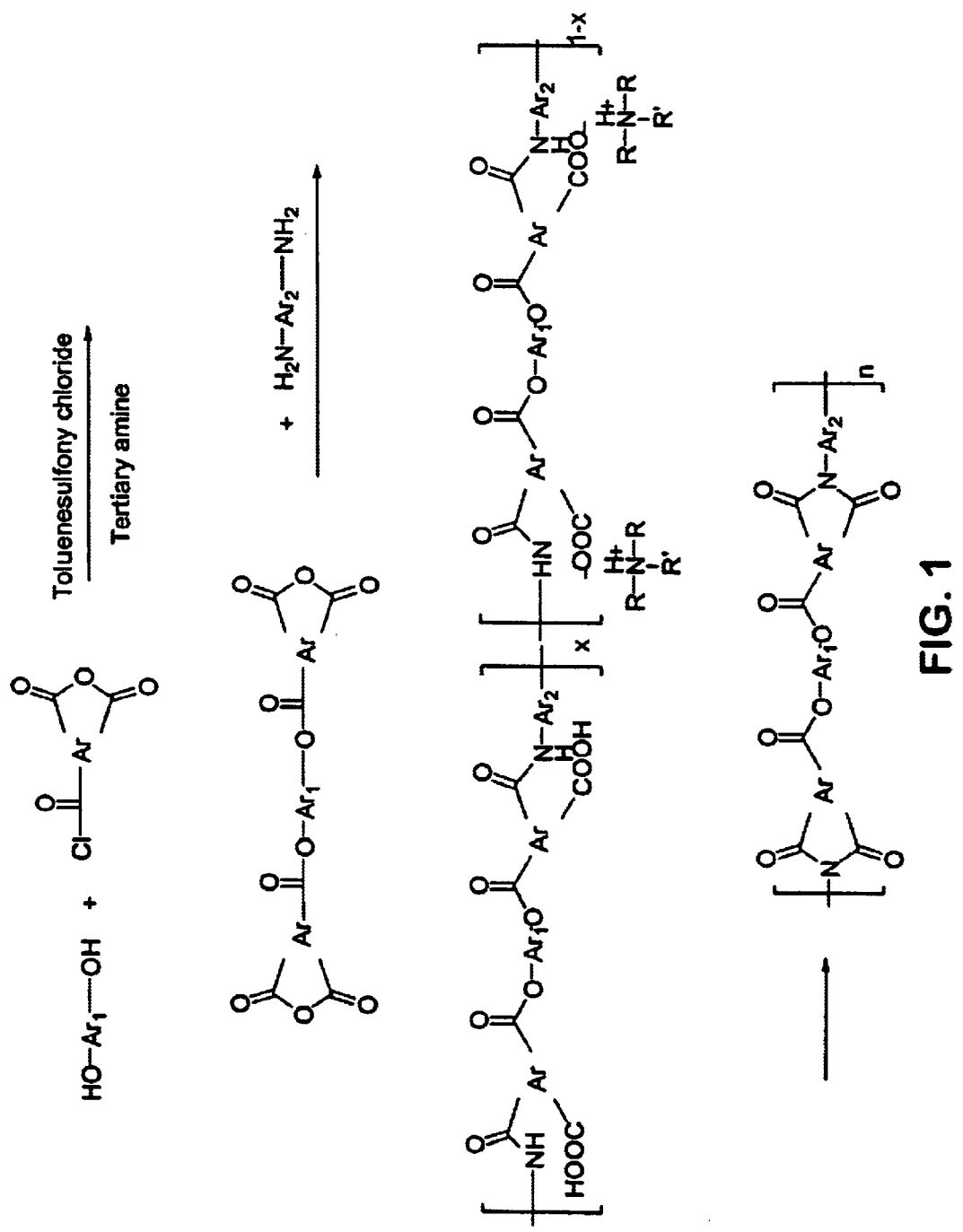
FIG. 1 is a schematic illustration of the novel one-pot process for the preparation of poly(etser imide)s.

We have unexpectedly discovered a low temperature solution polymerization method for the preparation of polyesters. High molecular weight polyesters are prepared from aromatic dicarboxylic chlorides and aromatic diols at room temperature. The key for the success is the use of certain catalysts. The preferred catalyst are toluenesulfonyl chloride, trimethylsilane chloride, triphenyl phosphite and mixtures thereof and the like compounds. High molecular weight polyesters could not be obtained without the presence of the catalyst. High molecular weight is defined as sufficient for a polymer to form an integral film. Generally, the inherent viscosity of the polymer should be higher than 0.2 dL/g for the polymer to be a film former. The amounts of the catalyst used can be in the range of 0.1 to 2 per mole of aromatic diol, preferably in the range of 0.1 to 0.5.

The synthesis of polyesters can be carried out in an aprotic solvent. Aprotic solvents include, but are not limited to N,N'-dimethylformamide (DMF), N,N'-dimethylacetamide (DMAc), N-methylpyrrolidinone (NMP), and the like. An aromatic diol, an aromatic dicarboxylic chloride and a catalyst are first disssolved in the aprotic solvent. All the reactants can be added into the reaction vessel at the same time or the reactants can be added into the reaction vessel sequentially. The molar ratio between the diol and the aromatic dicarboxylic chloride is maintained in the range of 0.95: 1 or 1: 1.1. If the molar ratio is out of the specified range, high molecular weight polymers will not be formed. When different aromatic diols or different aromatic dicarboxylic chloride are used, random copolyesters are obtained. Cooling may be applied to bring the temperature of the reaction mixture down to below room temperature, for example, 0° C., if necessary. On the other hand, for the low reactivity diols, elevated temperatures may be further applied to facilitate the formation of the ester bond. An organic base, such as pyridine or triethylamine, is then added to the reaction mixture over a period of time, preferably from 10 minutes to 10 hours. The reaction mixture may be further stirred for 1–24 hours to complete the polymerization.

The general structure of an aromatic diol of the instant invention is depicted as:

$$HO—Ar_1—OH$$

Where —Ar$_1$— is independently

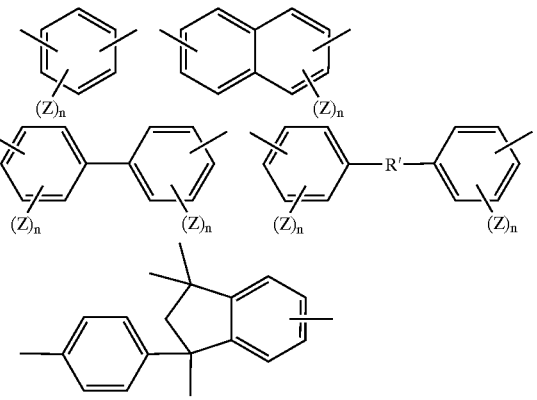

or a mixture thereof;

—R'— is

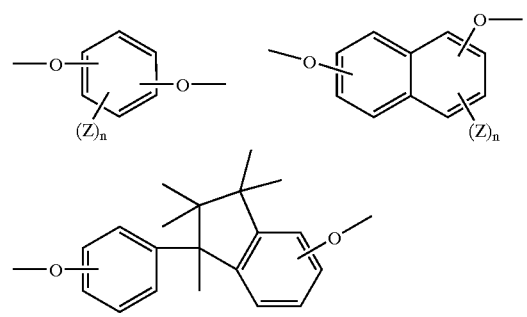

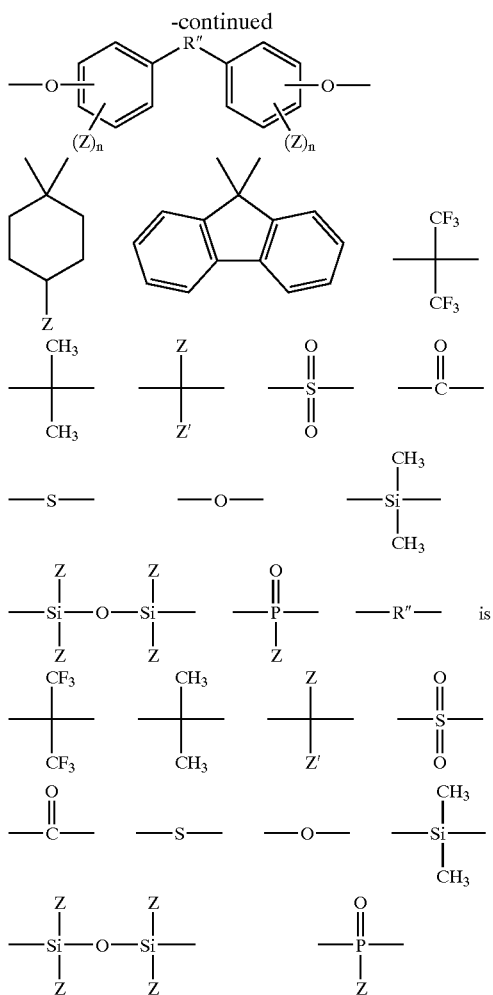

Z and Z' are:
—H, —CH$_3$, —CH$_2$CH$_3$, —CH$_2$CH$_2$CH$_3$, iso-propyl, iso-butyl, tert-butyl, —Br, —Cl, —F, —NO$_2$, —CN

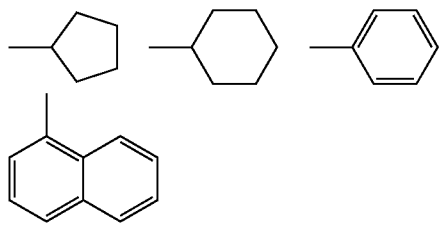

n = 0 - 4.

An organic base, typically a tertiary amine, is used to neutralize the byproduct acid formed from reaction of the acid chloride and the diol. Suitable tertiary amines include heterocyclic, alicyclic or aromatic amines or amines of the following general formula: R$_1$R$_2$R$_3$N, wherein R$_1$, R$_2$ and R$_3$, may be the same or different but are as defined above. Illustrative examples of suitable amines are trimethylamine, triethylamine, tri-n-propylamine, tri-isopropylamine, N,N-dimethylhexylamine, N,N-dimethyldodecylamine, N,N-ethylethanol-amine, N-methyldiethanolamine, tri-n-butyl-mine, tri-n-hexyl-amine, tri-iso-octylamine, N,N,N',N'-tetramethyl-ethylenediamine, DABCO® (1,4-di-aza-bi-cyclo-[2,2,2]octane), pyridine, imidazole, 1,2,4-triazole, benzimidazole, naphthimidazole, purine, quinoline, isoquinoline, pyridazine, phthalazine, quinazoline, cinnoline, naphthylidine, acridine, phenanthridine, benzoquinoline, benzisoquinoline, benzocinnoline, benzophthalazine, benzoquinazoline, phenanthroline, phenazine, carboline, perimidine, 2,2'-dipyridyl, 2,4'-dipyridyl, 4,4'-dipyridyl, 2,2'-diquinolyl, picolinamide, nicotinamide, isonicotinamide, N,N-dimethylnicotinamide, N,N-diethylnicotinamide, N,N-dimethylisonicotinamide, N,N-diethylisonicotinamide, picolinic ester, nicotinic ester, isonicotinic ester, 2-pyridine sulfonamide, 3-pyridine sulfonamide, 4-pyridine sulfonamide, picolinaldehyde, nicotinaldehyde, isonicotinaldehyde, 3-nitropyridine, 3-acetoxypyridine, and the like.

2. Poly(ester amide)s

We have also discovered the low temperature solution polymerization method for the preparation of random poly(ester amide)s. Specifically, an aromatic diol and an aromatic diamine are copolymerized with an aromatic dicarboxylic dichloride in the presence of a catalyst. Toluenesulfonyl chloride, trimethylsilane chloride, triphenyl phosphite and the like compounds are the preferred catalyst. High molecular weight poly(ester amide)s could not be obtained without the presence of the catalyst,. The amounts of the catalyst used can be in the range of 0.1 to 2 per mole of the aromatic dicarboxylic chloride, preferably in the range of 0.1 to 0.5.

The synthesis of poly(ester amide)s can be carried out in an aprotic solvent. Aprotic solvents include, but are not limited to N,N'-dimethylformamide (DMF), N,N'-dimethylacetamide (DMAc), N-methylpyrrolidinone (NMP), and the like. The following procedures represent the best mode to carry out the synthesis of high molecular weight poly(ester amide)s. First, the aromatic diamine should be dissolved in the reaction vessel with stirring. An inorganic salt, for example, anhydrous lithium chloride, calcium chloride, and so on, can be optionally added to aid the solubility of the resulting polymers. The desired amounts of aromatic dicarboxylic chloride is then added over a period of time. The period of time can be in the range from 10 minutes or less and up to 10 hours or more. If necessary, cooling may be applied to bring the temperature of the reaction mixture down to below room temperature, for example, 0° C. After the addition of the aromatic dicarboxylic chloride, an organic base, such as pyridine or triethylamine, can be optionally added to the reaction mixture over a period of time, preferably from 10 minutes to 10 hours. The reaction mixture may be further stirred for 0.5–24 hours, preferably for 1–8 hours to substantially complete the formation of the amide. In the next step, predetermined amounts of an aromatic diol along with a catalyst are added to the reaction mixture in one portion or in several portions. If an organic base has not been added before this point, it should be added into the reaction mixture. The reaction mixture is further stirred under an inert atmosphere at room temperature for 2 to 24 hours, preferable 3 to 16 hours to obtain high molecular weight poly(ester amide)s.

The general structure of an aromatic diol of the instant invention is depicted as:

HO—Ar$_1$—OH where Ar$_1$ is the same as defined in the previous section.

The general structure of an aromatic diamine of the instant invention is depicted as:

H$_2$N—Ar$_2$.NH$_2$

Where —Ar$_2$— is independently

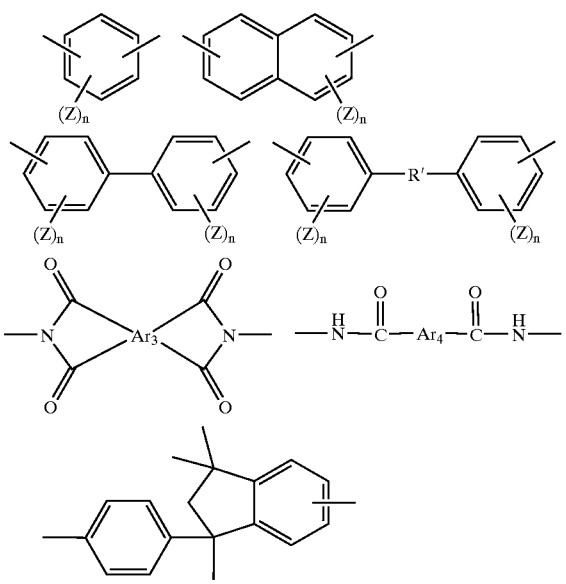

or a mixture thereof;

Where Ar$_3$ is independently

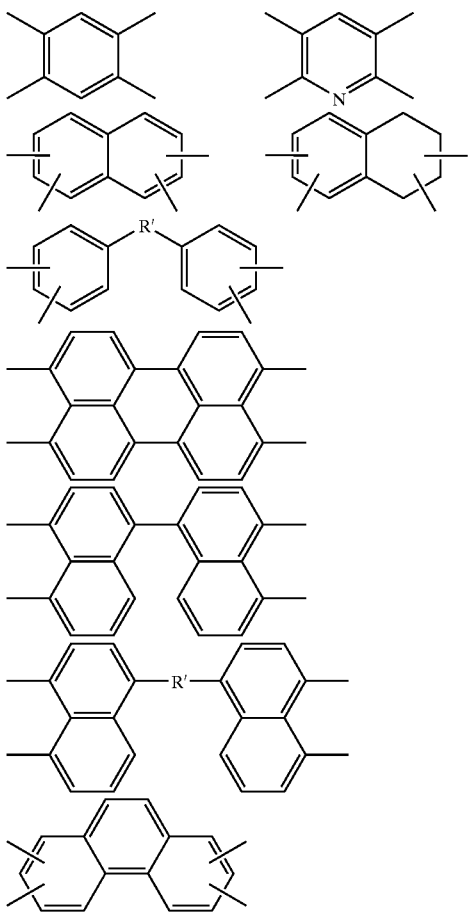

-continued

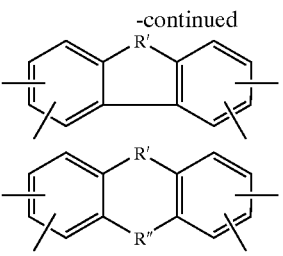

or a mixture thereof;
—Ar$_4$— is

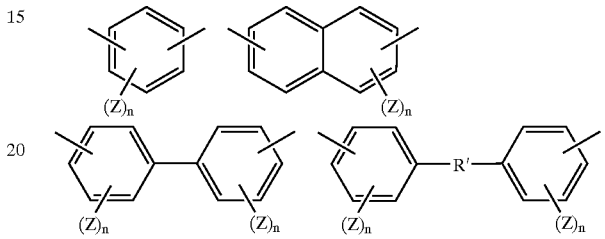

An organic base, typically a tertiary amine, is used to neutralize the byproduct acid formed from the reaction of the acid chloride and a diol. Suitable tertiary amines include heterocyclic, alicyclic or aromatic amines or amines of the following general formula: $R_1R_2R_3N$, wherein $R_1$, $R_2$ and $R_3$, may be the same or different but are as defined above.

3. Poly(ester imide)s

We have discovered a novel one-pot process for the preparation of poly(ester imide)s. This is carried out under mild polymerization conditions Specifically, a diol is reacted with an anhydride chloride, for example, trimellitic anhydride chloride, to form an intermediate ester anhydride in the presence of a catalyst and an organic base, such as pyridine. High molecular weight poly(ester imide)s are formed in one-pot process by sequentially adding a diamine to the reaction mixture without isolation of the moisture sensitive intermediate, ester dianhydride, as shown in FIG. 1. It was found that the presence of a catalyst is essential to the formation of high molecular weight polymers in the instant process.

The synthesis of poly(ester imide)s can be carried out in an aprotic solvent. Aprotic solvents include, but are not limited to N,N'-dimethylformamide (DMF), N,N'-dimethylacetamide (DMAc), N-methylpyrrolidinone (NMP), dimethylsulfoxide (DMSO), and the like. A diol, the trimellitic anhydride chloride and a catalyst are first disssolved in the aprotic solvent. The molar ratio between the diol and the trimellitic anhydride chloride is maintained in the range of 0.95: 2 or 1: 2.2. If the molar ratio is out of the specified range, high molecular weight polymers will not be formed. If necessary, cooling may be applied to bring the temperature of the reaction mixture down to below room temperature, for example, 0° C. On the other hand, for the low reactivity diols, elevated temperatures may be further applied to facilitate the formation of the ester bond. An organic base, such as pyridine or triethylamine, is then added to the reaction mixture over a period of time, preferably from 10 minutes to 10 hours. The reaction mixture may be further stirred for 1–24 hours to complete formation of ester dianhydride. A diamine monomer is then added in one portion, or in several small portions, to the reaction mixture and a high molecular weight polyamic acid is formed. The thus formed polyamic acid can be mixed polyamic acids with some of its carboxylic acid neutralized with the tertiary amine added at the stage of formation of ester linkage. The amount of neutralized carboxylic acid depends on the amount of tertiary amine added thereof. The polymeric precursor can be isolated prior to use or converted directly to poly(ester imide)s. A dehydration agent, for example, acetic anhydride, or heat can be applied to effect the imidization, as known to those skilled in the art. The polymeric precursor can be further neutralized with a base, such as a tertiary amine to form a soluble polyamic acid salt, as disclosed in our separate patent filing, herein incorporated by reference. Poly(ester imide)s or polyamic acid salts may be isolated and purified by pouring into a non-solvent or used without isolation, depending on the desired application.

The general structure of poly(ester imide)s of the instant invention is depicted as general formula I. Where —Ar$_1$— and —Ar$_2$— are the same as the ones defined in the previous sections and Ar is independently

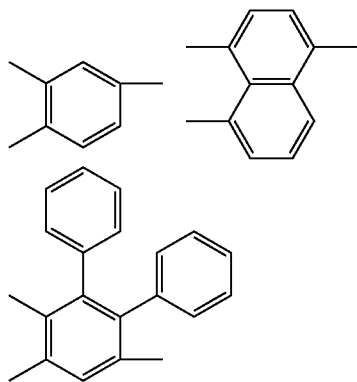

or a mixture thereof.

An organic base, typically a tertiary amine, is used to neutralize the byproduct acid formed from the acid chloride and a diol. Suitable tertiary amines include heterocyclic, alicyclic or aromatic amines or amines of the following general formula: $R_1R_2R_3N$, wherein $R_1$, $R_2$ and $R_3$, may be the same or different but are as defined above.

It was further found that incorporation of a catalyst is an essential part of the novel one-pot process. Toluenesulfonyl chloride, trimethylsilane chloride, triphenyl phosphite and mixtures thereof and the like compounds are the preferred catalyst. Without the presence of the catalyst, high molecular weight poly(ester imide)s could not be obtained. High molecular weight is defined as sufficient to form an integral film. Generally, the inherent viscosity must be higher than 0.2 dL/g for the polymer to be a film former. The amounts of catalyst used can be in the range of 0.1 to 2 per mole of the aromatic diol, preferably in the range of 0.1 to 0.5.

The instant invention provides a convenient process for the preparation of novel poly(ester amide)s and poly(ester imide)s, which are very difficult to form by other methods. These novel poly(ester amide)s and poly(ester imide)s are derived from the following diols.

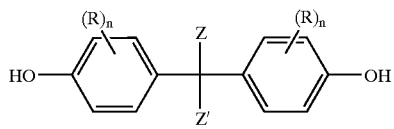

where n=1–2 and R is:
—H, —CH$_3$, —CH$_2$CH$_3$, —CH$_2$CH$_2$CH$_3$, iso-propyl, iso-butyl, tert-butyl, —Br, —Cl, —F, —NO$_2$, —CN

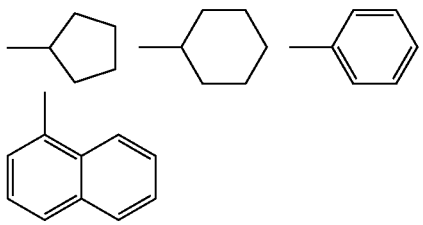

Z and Z' are:

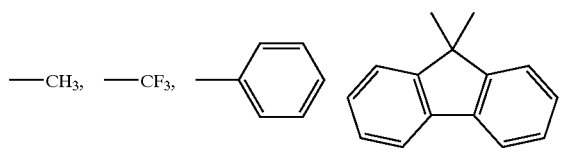

The polyesters, poly(ester amide)s and poly(ester imide)s prepared by the teachings of present invention are useful materials for high temperature applications, such as fireproofing articles and as membranes for fluid separations.

We have found that polyesters, poly(ester amide)s and poly(ester imide)s of this invention exhibit excellent combination of gas separation/permeation characteristics and are extremely useful for gas separation applications. The polymers of this invention can be fabricated into different membrane shapes such as flat sheets or hollow fibers. Furthermore, the membranes can be porous or dense and composite or asymmetric in structure, including the multi-component structure. The resulting polymeric materials may then, if desired, be blended using conventional solution blending technology to yield a blend having specifically tailored properties. Gas separation membranes prepared from these materials containing ester linkages of the present invention possess an excellent balance of gas permeation rates and selectivities for one gas over the other gases in a multicomponent gas mixture. For example, the poly(ester imide) material described in Example 3 of this invention was found to have a high permeation rate for oxygen of 8.9 Barrers while maintaining a good oxygen/nitrogen selectivity of 5.8.

The following examples will serve to illustrate the utility of this invention but should not be construed as limiting. The gas permeability of the flat sheet polymeric membranes was determined by the following procedure. In the test, the membrane to be tested was sandwiched between two aluminum foils exposing a 2.54 cm diameter area, placed in a permeation cell and sealed with epoxy resin. The downstream side of the cell was evacuated up to $2\times10^{-2}$ mmHg and the permeate feed gas was introduced from the upstream side. The pressure of the permeate gas on the downstream side was measured using a MKS-Barathon pressure transducer. The permeability coefficient P was calculated from the steady-state gas permeation rate according to the equation:

P=C×V×L×dp/dt×1/h
C=constant
V=volume of collection receiver
L=thickness of film
h=upstream pressure
dp/dt=slope of steady-state line The permeability coefficient P is reported in Barrer units (1 Barrer=$10^{-10}$ $cm^3$ $cm/cm^2$ cmHg sec).

EXAMPLE 1

Figure 2:
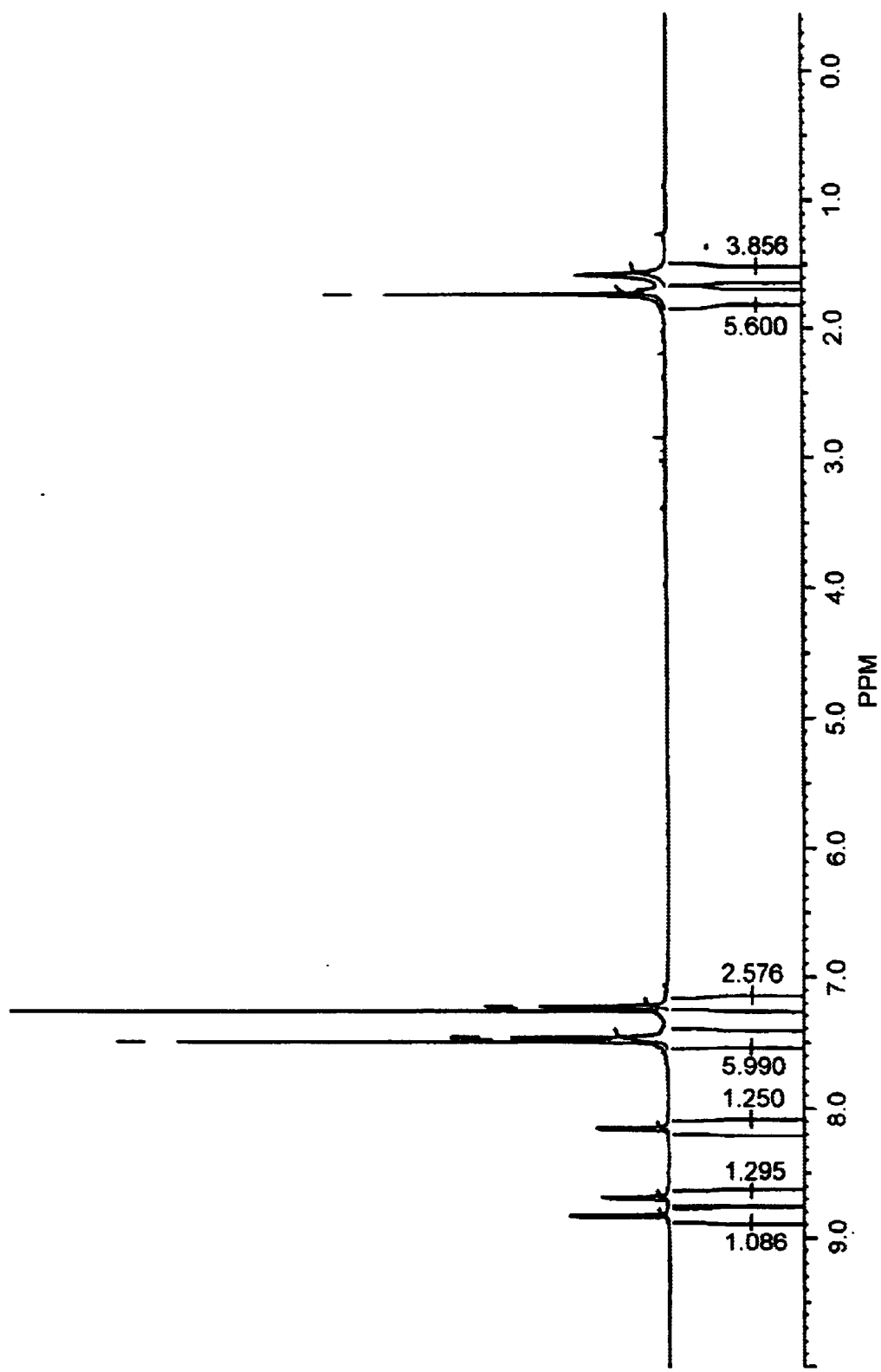
FIG. 2 is a $^1$H-NMR spectrum of poly(ester imide) TBBA-ODA (CDCl$_3$) (Symbols are defined in Table 1).

A 500 mL four neck round flask equipped with a nitrogen inlet, a thermometer, a dropping funnel and a mechanical stirrer was charged with 10.53 g (0.05 mol) of trimellitic anhydride chloride (Aldrich), 1.5 g (0.008 mol) of toluenesulfonyl chloride (Aldrich), 13.60 g (0.025 mol) of tetrabromobisphenol A (TBBA) and 80 mL of NMP. The mixture was stirred until a homogeneous solution was obtained. Subsequently, the mixture was cooled down to 5° C. with an ice-water bath. 8.0 mL of pyridine was then added through the dropping funnel over a period of 20 min. The solution was stirred at 5° C. for 2 hours and then gradually warmed up to room temperature overnight. At this point, 5.01 g (0.025 mol) of 4,4'-oxydianiline (ODA) was added in one portion and the mixture was stirred for additional 3 hours. A very viscous solution was thus obtained. 10 mL of acetic anhydride were then added to the mixture and the reaction mixture was further stirred overnight. The polyester imide (TBBA-ODA) was isolated by pouring the solution into excess amount of methanol and further purified by redissolving in methylene chloride and reprecipitating into methanol. The inherent viscosity of the polymer was 0.54 dL/g measured in the methylene chloride at the concentration of 0.4 g/dL. The H-NMR spectrum of the polymer is shown in FIG. 2. A dense film of TBBA-ODA polyester imide was cast from methylene chloride solution on a clean glass plate in a glove bag. The film was further dried at 100° C. under vacuum for 48 hours. The gas permeation characteristics of the polymer were measured as described above and are summarized in Table 1.

EXAMPLES 2–5

Figure 3:
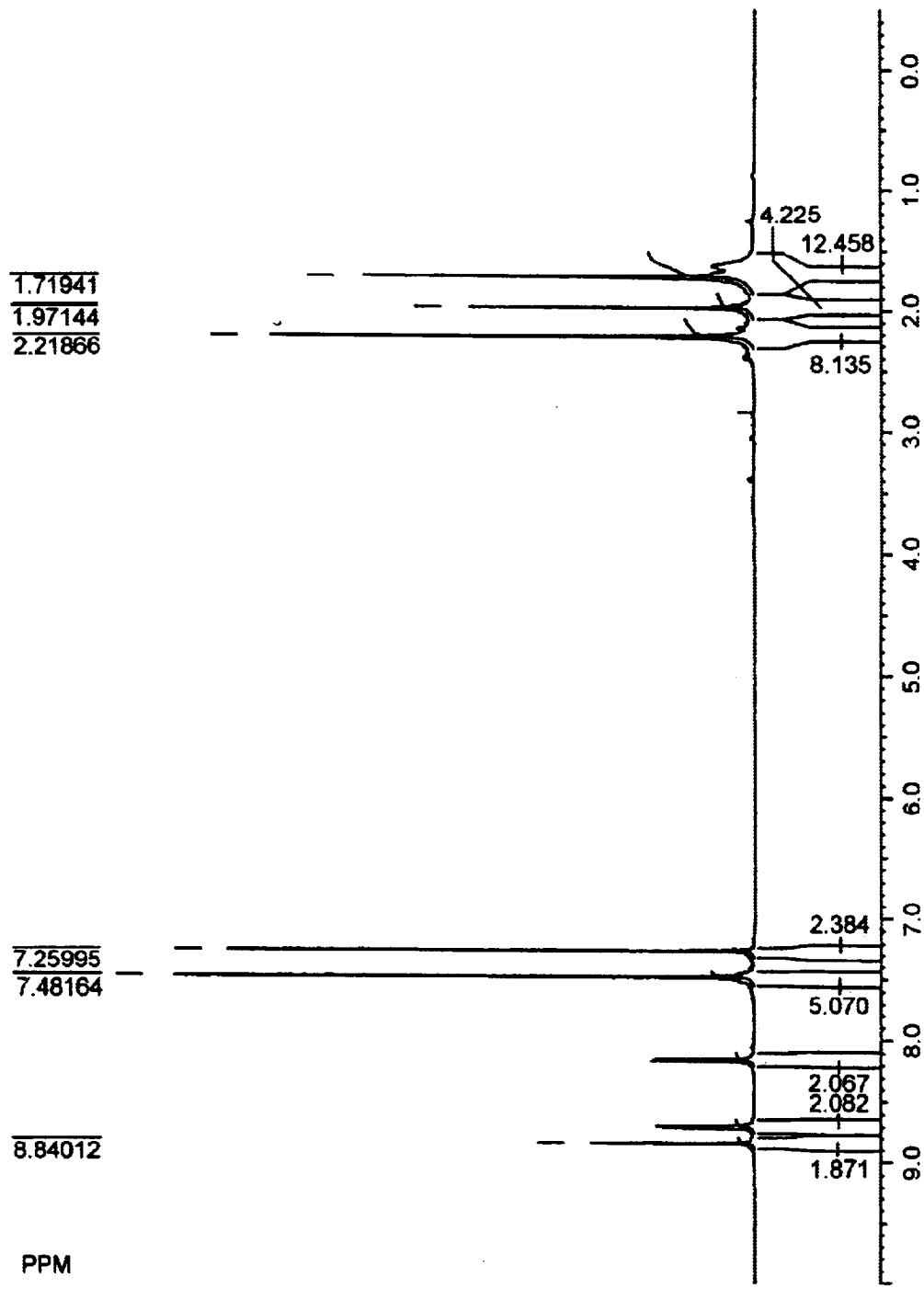
FIG. 3 is a $^1$H-NMR spectrum of poly(ester imide) TBBA-TMPDA (CDCl$_3$) (Symbols are defined in Table 1).

Poly(ester imide)s in Examples 2–5 were prepared described in Example 1. The H-NMR spectrum of the poly(ester imide) TBBA-TMPDA is shown in FIG. 3. The gas permeation characteristics of the novel poly(ester imide)s are summarized in Table 1.

TABLE 1

| Example | Polyesterimide | P(He) | P($O_2$) | P($N_2$) | P($CH_4$) | P($CO_2$) | P($O_2$)/P($N_2$) | P($CO_2$)/P($N_2$) | P($CO_2$)/P($CH_4$) |
|---------|----------------|-------|----------|----------|-----------|-----------|-------------------|--------------------|---------------------|
| 1 | TBBA-ODA | 14.3 | 1.2 | 0.17 | | | 6.8 | | |
| 2 | TBBA-1,3-PDA | 18.6 | 1.3 | 0.17 | | | 7.5 | | |
| 3 | TBBA-TMPDA | 58.3 | 8.9 | 1.5 | 1.3 | 42 | 5.8 | 27 | 34 |
| 4 | TBBA-HAB | 7.2 | 0.4 | 0.06 | | | 6.8 | | |
| 5 | TMBA-ODA | 19.1 | 1.6 | 0.26 | 0.2 | 6.6 | 6.1 | 26 | 34 |

The permeability is in Barrer unit;
TBBA: tetrabromobisphenol A;
TMBA: tetramethylbisphenol A;
ODA: 4,4'-oxydianiline;
PDA: phenylenediamine;
TMPDA: 2,4,6-trimethyl-m-phenylenediamine;
HAB: 3,3'-dihydroxybenzidine.

EXAMPLE 6

The polyester with the following structure was prepared by the following procedure:

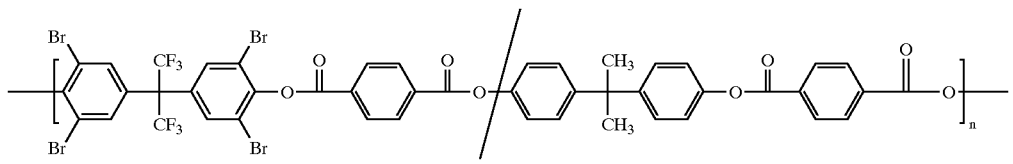

A 500 mL four neck round flask equipped with a nitrogen inlet, a thermometer, a dropping funnel and a mechanical stirrer was charged with 10.15 g (0.05 mol) of terephthaloyl chloride (Aldrich), 1.7 g (0.009 mol) of toluenesulfonyl chloride (Aldrich), 16.30 g (0.025 mol) of hexafluoroisopropylidene-bis(2,6-dibromophenol) (6FTBBA), 5.71 g (0.025 mol) of bisphenol A and 80 mL of NMP. The mixture was stirred until a homogeneous solution was obtained. Subsequently, the mixture was cooled down to 5° C. with an ice-water bath. 8.0 mL of pyridine was then added through the dropping funnel over a period of 20 min. The solution was stirred at 5° C. for 2 hours and then gradually warmed up to room temperature overnight. A very viscous solution was thus obtained. The polymer was isolated by pouring the solution into excess amount of methanol and further purified by redissolving in methylene chloride and reprecipitating into methanol. The inherent viscosity of the polymer was 0.38 dL/g measured in the methylene chloride at the concentration of 0.4 g/dL at 25° C.

EXAMPLE 7

The poly(ester amide) with the following structure was prepared by the following procedure:

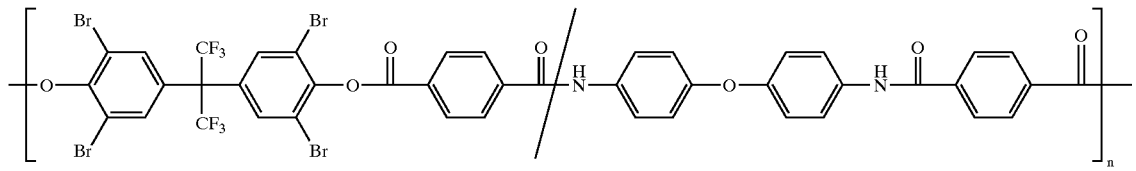

A 500 mL four neck round flask equipped with a nitrogen inlet, a thermometer, a dropping funnel and a mechanical stirrer was charged with 5.01 g (0.025 mol) of 4,4'-oxydianiline and 80 mL of NMP. The mixture was stirred until a homogeneous solution was obtained. 10.15 g (0.05 mol) of terephthaloyl chloride was added into the reaction mixture in several portions. The mixture was stirred at room temperature for 2 hours and 8.0 mL of pyridine was then added through the dropping funnel over a period of 20 min. The solution was further stirred for 1 hour. 1.7 g (0.009 mol) of toluenesulfonyl chloride (Aldrich), 16.30 g (0.025 mol) of hexafluoroisopropylidene-bis(2,6-dibromophenol) (6FTBBA) were then added in one portion. After stirring at room temperature for 4 hours, very viscous solution was thus obtained. The poly(ester amide) was isolated by pouring the solution into excess amount of methanol. The inherent viscosity of the polymer was 0.57 dL/g measured in the NMP containing 0.1% LiCl at the concentration of 0.4 g/dL at 25° C.

EXAMPLE 8

The poly(ester amide) with the following structure was synthesized using the same procedure as the one described in Example 7.

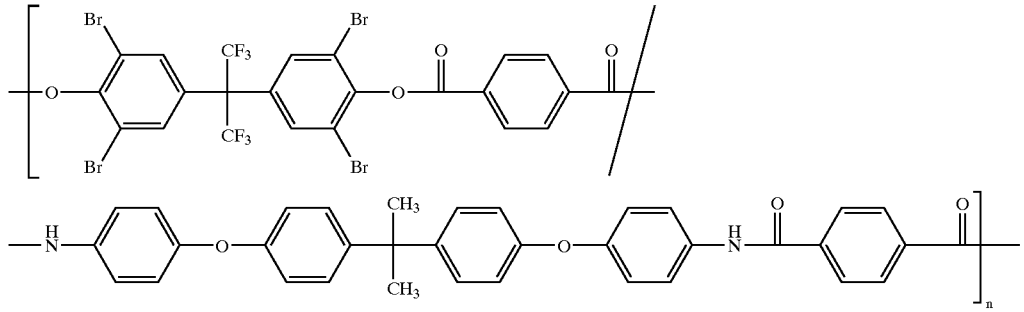

The inherent viscosity of the polymer was 0.62 dL/g measured in the NMP containing 0.1% LiCl at the concentration of 0.4 g/dL at 25° C.

EXAMPLE 9

The poly(ester amide) with the following structure was synthesized using the same procedure as the one described in Example 7.

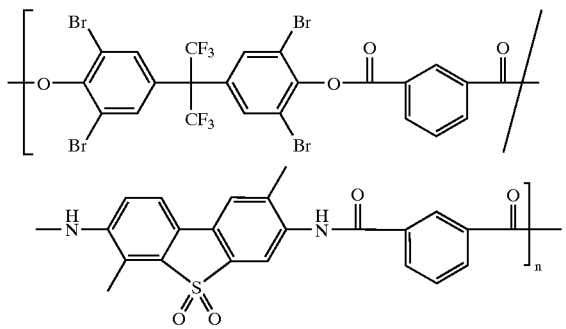

The inherent viscosity of the polymer was 0.31 dL/g measured in the NMP at the concentration of 0.4 g/dL at 25° C.

EXAMPLE 10

The poly(ester amide) with the following structure was synthesized using the same procedure as the one described in Example 7.

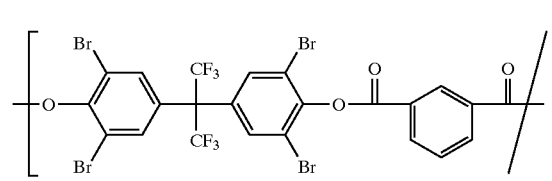

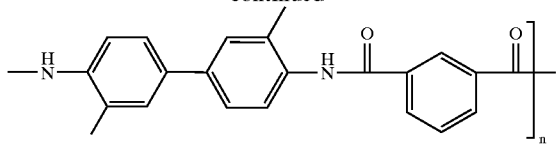

The inherent viscosity of the polymer was 0.51 dL/g measured in the NMP at the concentration of 0.4 g/dL at 25° C.

EXAMPLE 11

The poly(ester amide) with the following structure was synthesized using the same procedure as the one described in Example 7.

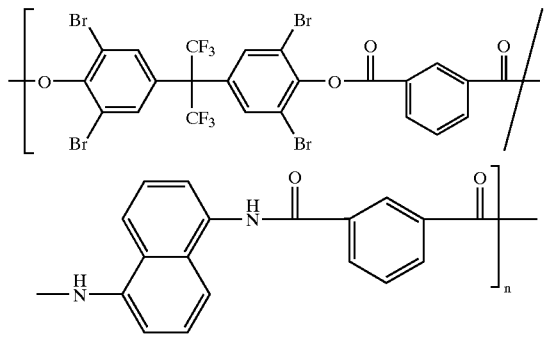

The inherent viscosity of the polymer was 0.37 dL/g measured in the NMP at the concentration of 0.4 g/dL at 25° C.

EXAMPLE 12

The poly(ester amide) with the following structure was synthesized using the same procedure as the one described in Example 7.

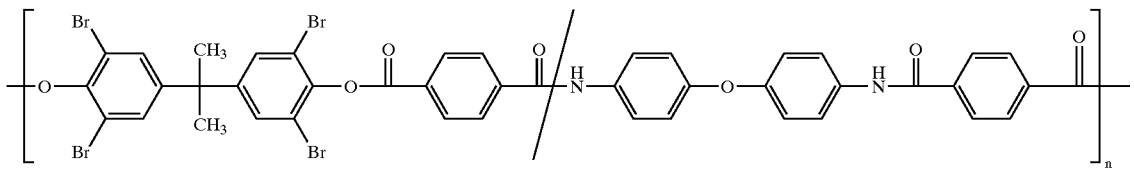

The inherent viscosity of the polymer was 0.92 dL/g measured in the NMP containing 0.1% of LiCl at the concentration of 0.4 g/dL at 25° C.

EXAMPLE 13

The poly(ester amide) with the following structure was synthesized using the same procedure as the one described in Example 7.

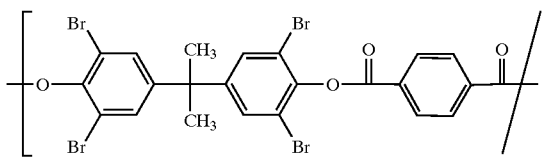

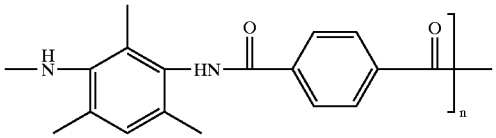

The inherent viscosity of the polymer was 0.59 dL/g measured in the NMP at the concentration of 0.4 g/dL at 25° C.

EXAMPLE 14

The poly(ester amide) with the following structure was synthesized using the same procedure as the one described in Example 7.

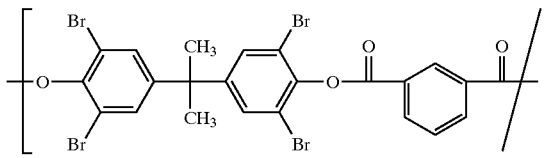

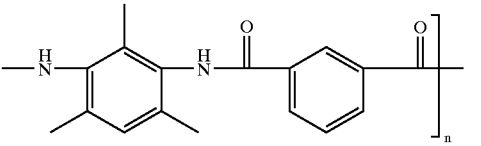

The inherent viscosity of the polymer was 0.89 dL/g measured in the NMP at the concentration of 0.4 g/dL at 25° C.

EXAMPLE 15

The poly(ester amide) with the following structure was synthesized using the same procedure as the one described in Example 7.

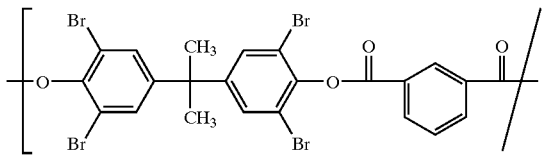

-continued

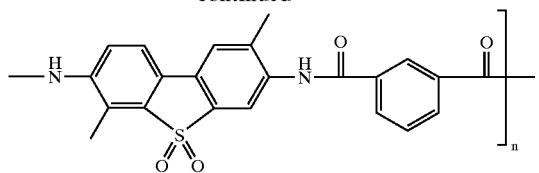

The inherent viscosity of the polymer was 0.67 dL/g measured in the NMP at the concentration of 0.4 g/dL at 25° C.

EXAMPLE 16

The poly(ester amide) with the following structure was synthesized using the same procedure as the one described in Example 7.

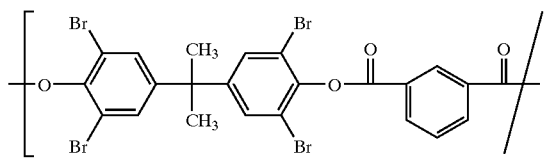

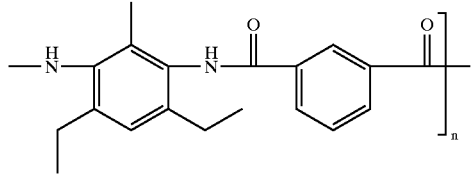

The inherent viscosity of the polymer was 0.40 dL/g measured in the NMP at the concentration of 0.4 g/dL at 25° C.

The term "comprising" used herein as meaning "including but not limited to", that is, as specifying the presence of stated features, integers, steps or components as referred to in the claims, but not precluding the presence or addition of one or more other features, integers, steps, components, or groups thereof.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A polymer containing a main-chain ester linkage which is formed by the solution polycondensation reaction between an acetyl chloride and a phenol in presence of a catalyst.

2. The polymer of claim 1 wherein the solution polycondensation reaction is catalyzed independently by toluenesulfonyl chloride, benzenesulfonylchloride, trimethylsilane chloride, and triphenyl phosphite or a mixture thereof.

3. The process of claim 1 wherein said polymer is a polyester, a poly(ester amide), or a poly(etser imide).

4. The polymer of claim 3 wherein said polymer is a poly(ester imide) of the following general formula:

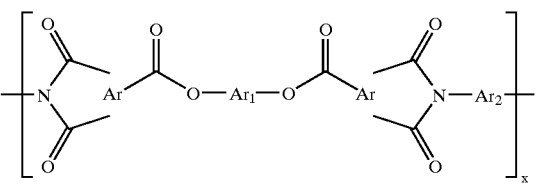

Where x is an integer larger than 10 and Ar is independently

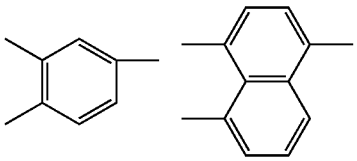

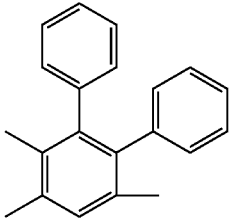

or a mixture thereof;

—$Ar_1$— is independently

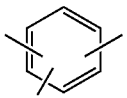
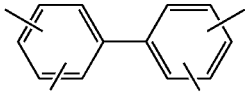
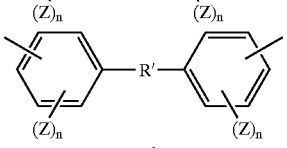
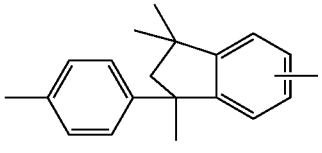

or a mixture thereof;
—R'— is

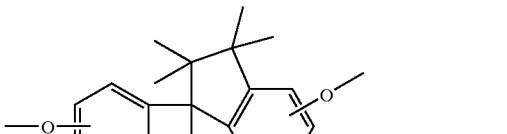
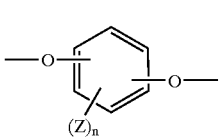

-continued
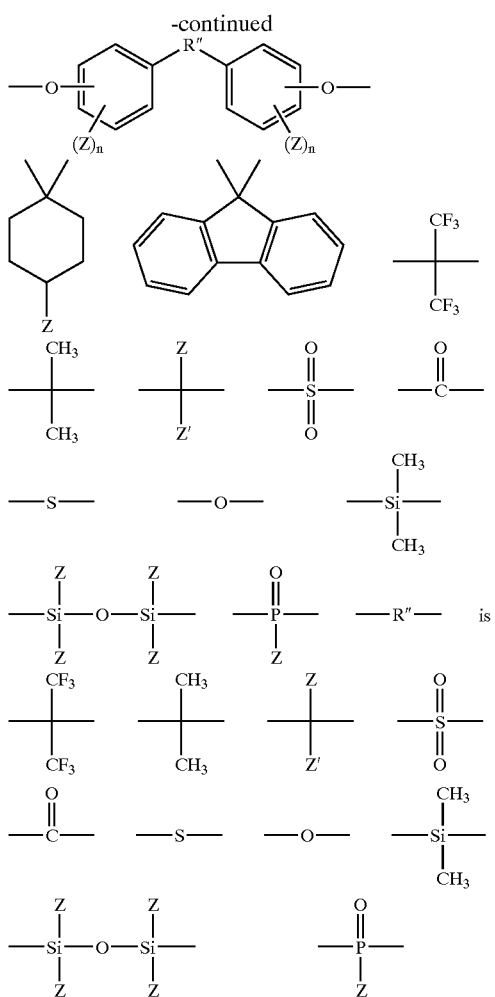
Z and Z' are:
—H, —CH$_3$, —CH$_2$CH$_3$, —CH$_2$CH$_2$CH$_3$, iso-propyl, iso-butyl, tert-butyl, —Br, —Cl, —F, —NO$_2$, —CN
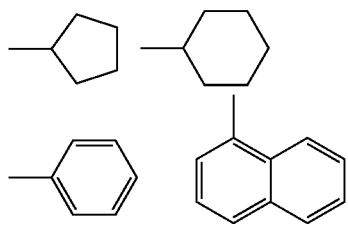
n = 0–4;
—Ar$_2$— is independently
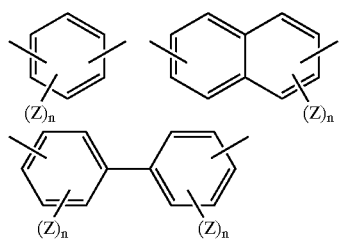
-continued
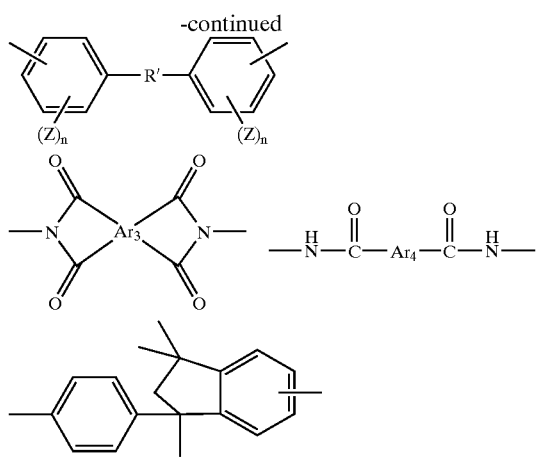
or a mixture thereof;
Where Ar$_3$ is independently
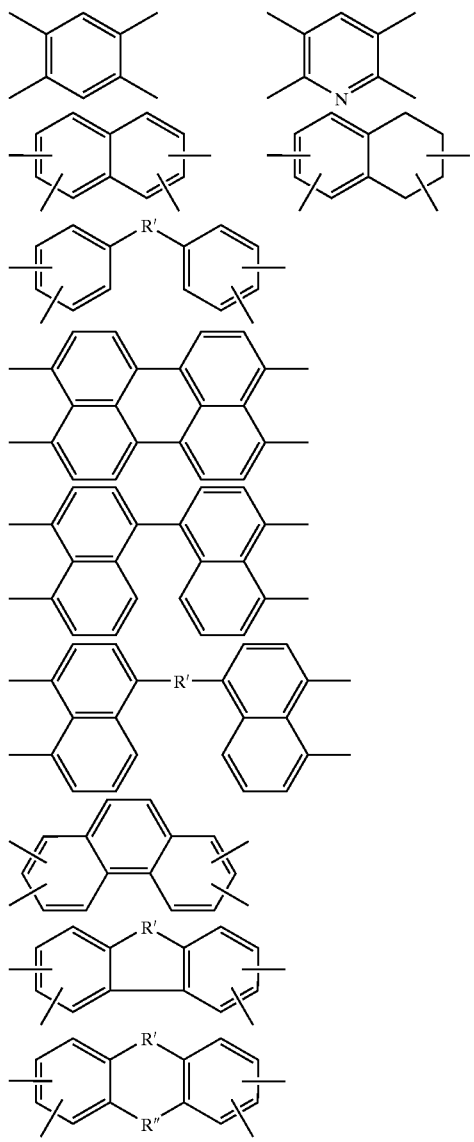

or a mixture thereof;

—Ar$_4$— is

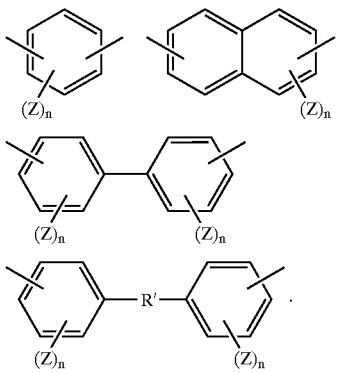

5. The polymer of claim 4 wherein said Ar is

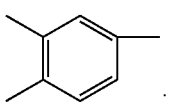

6. The polymer of claim 4 wherein said —Ar$_1$— is:

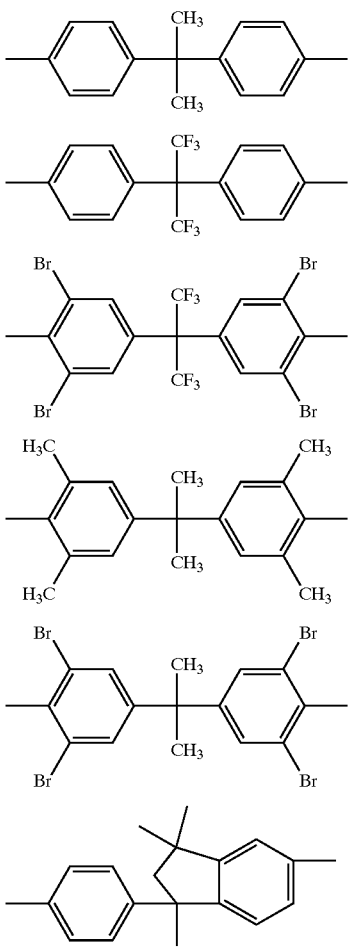

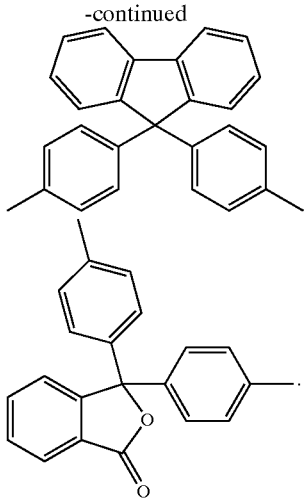

7. The polymer of claim 4 wherein said —Ar$_2$— is:

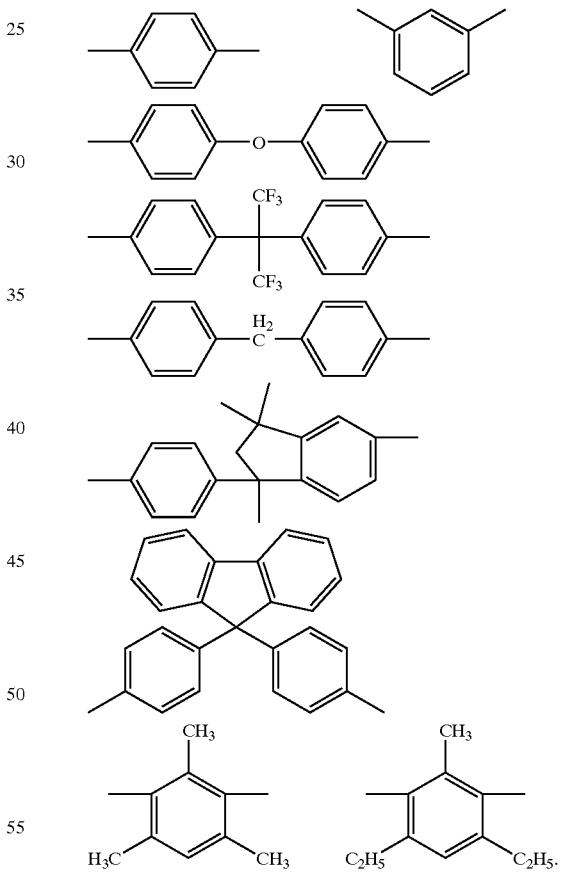

8. The polymer of claim 4 wherein said poly(ester imide) is formed by reacting tetrabromobisphenol A with one of the following dianilines: 4,4'-oxy-dianiline, 1,3-phenylenediamine, 1,4-phenylenediamine, 1,5-naphthalenediamine, 4,4'-hexafluoroisopropylidene dianiline, 2,4,6-trimethyl-1,3-phenylene diamine, or a mixture thereof.

9. The polymer of claim 4 wherein said poly(ester imide) is formed by reacting 4,4'-hexafluoroisopropylidene bisphenol with one of the following dianilines: 4,4'-oxy-dianiline, 1,3-phenylenediamine, 1,4-phenylenediamine, 1,5-naphthalenediamine, 4,4'-hexafluoroisopropylidene dianiline, 2,4,6-trimethyl-1,3-phenylene diamine, or a mixture thereof.

10. The polymer of claim 3 wherein said polymer is a poly(ester amide) of the following general formula:

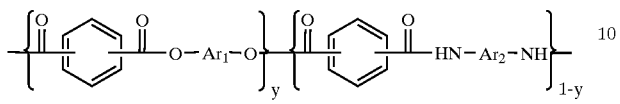

Where y is between 0.01 and 0.99 and —Ar₁— is independently

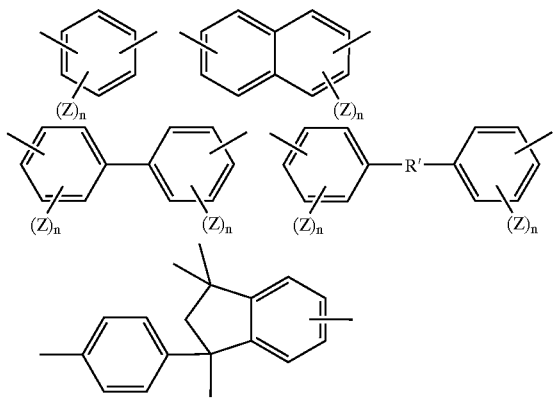

or a mixture thereof;

—R'— is

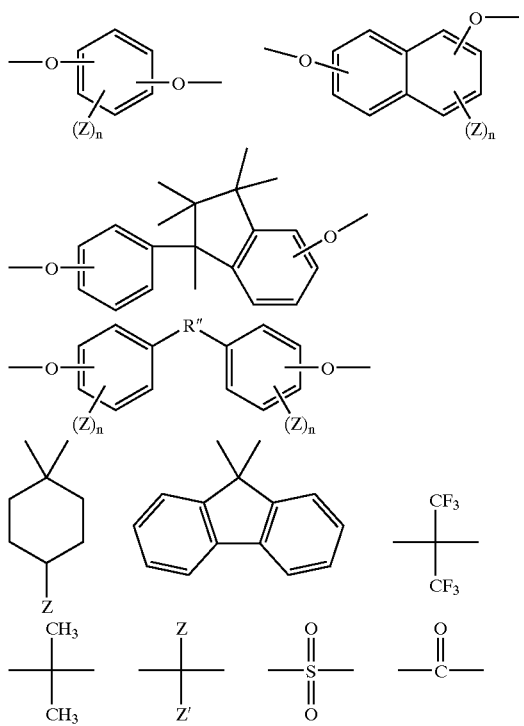

-continued

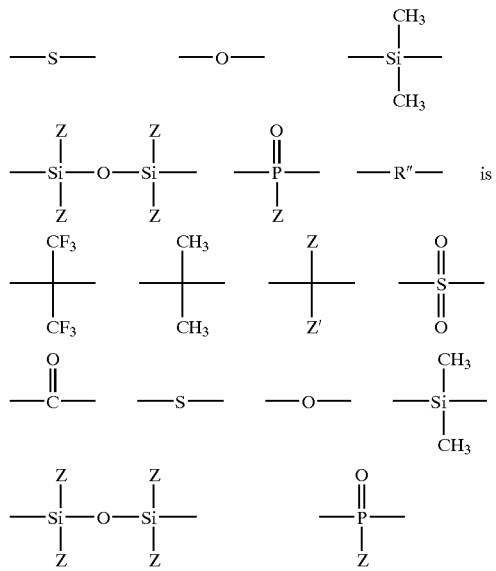

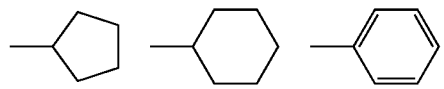 —R"— is

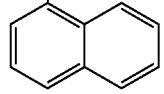

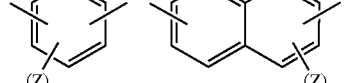

n = 0 - 4;

—Ar₂— is independently

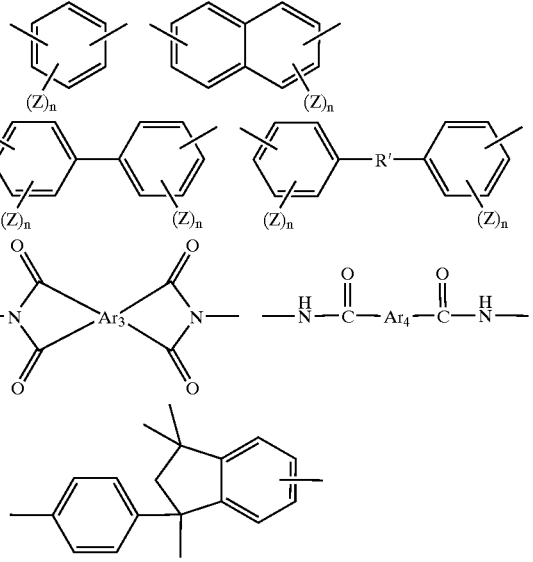

or a mixture thereof;

Where Ar₃ is independently
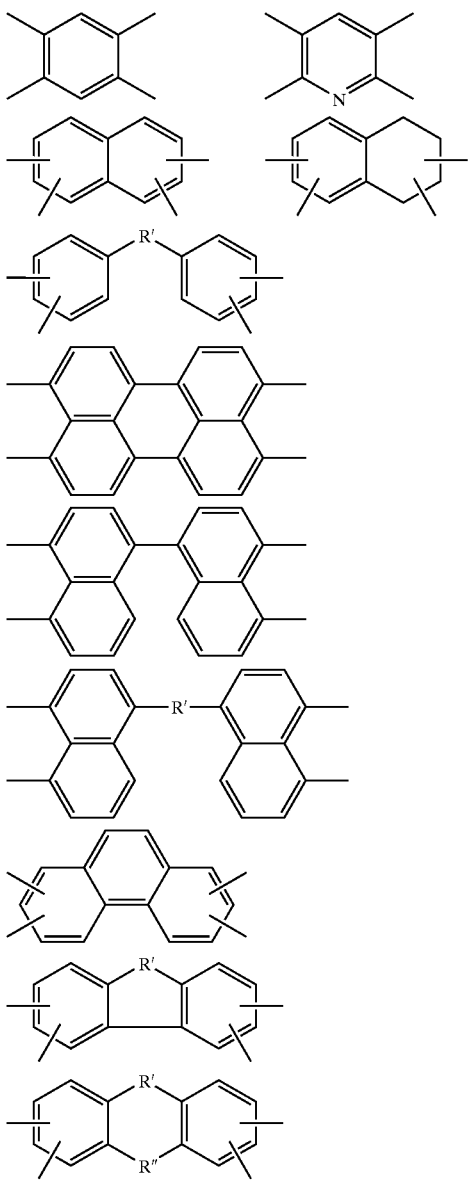
or a mixture thereof;
—Ar₄— is
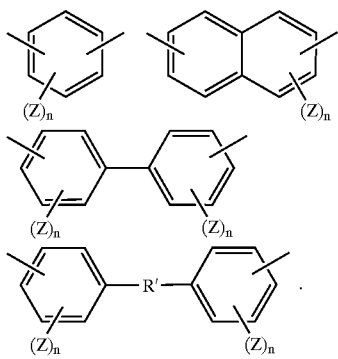
11. The polymer of claim 10 wherein said —Ar₁— is:
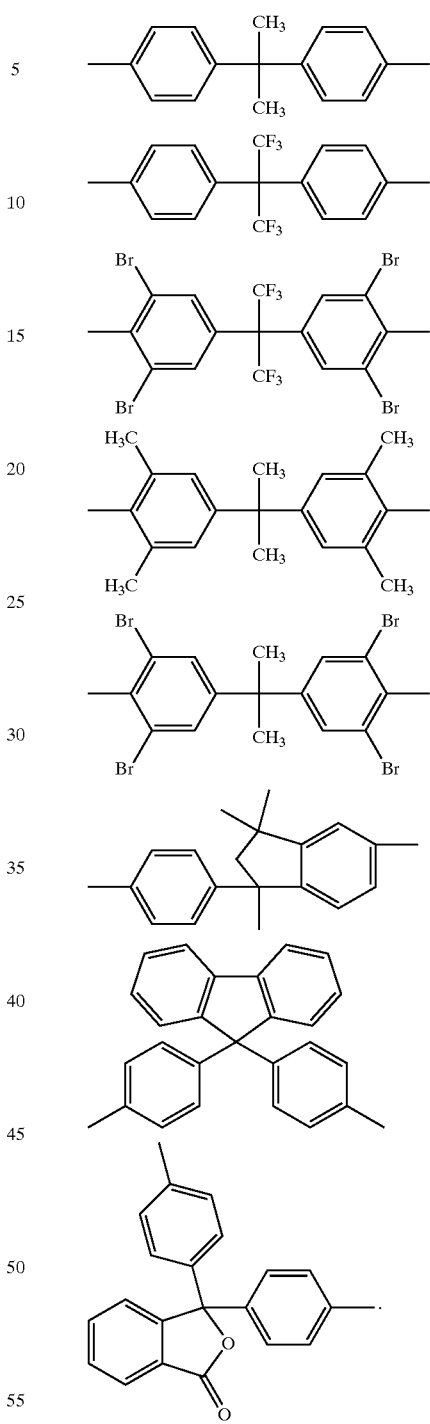
12. The polymer of claim 10 wherein said —Ar₂— is:
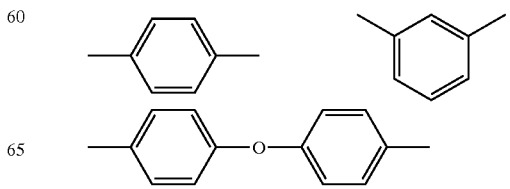

-continued

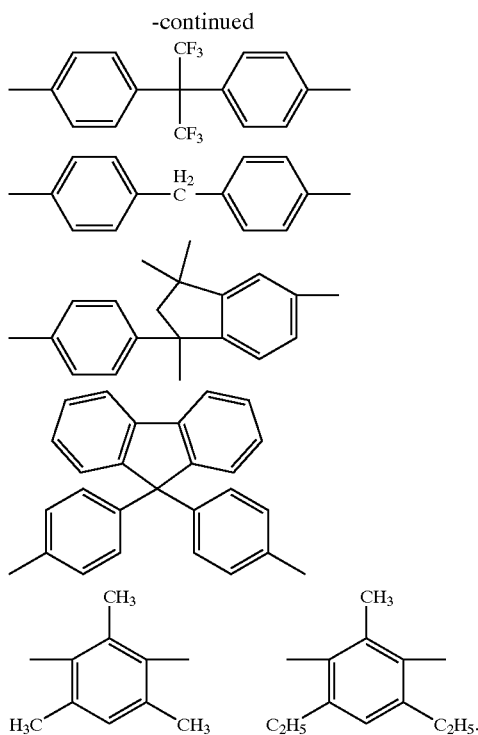

13. The polymer of claim 10 wherein said poly(ester amide) is formed by reacting tetrabromobisphenol A with one of the following dianilines: 4,4'-oxy-dianiline, 1,3-phenylenediamine, 1,4-phenylenediamine, 1,5-naphthalenediamine, 4,4'-hexafluoisopropylidene dianiline, 2,4,6-trimethyl-1,3-phenylene diamine, or a mixture thereof.

14. The polymer of claim 10 wherein said poly(ester amide) is formed by reacting 4,4'-hexafluoroisopropylidene bisphenol with one of the following dianilines: 4,4'-oxy-dianiline, 1,3-phenylenediamine, 1,4-phenylenediamine, 1,5-naphthalenediamine, 4,4'-hexafluoroisopropylidene dianiline, 2,4,6-trimethyl-1,3-phenylene diamine, or a mixture thereof.

15. The polymer of claim 3 wherein said polymer is a polyester of the following general formula:

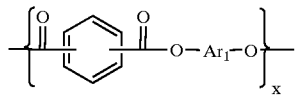

Where x is an integer larger than 10 and —Ar$_1$— is independently

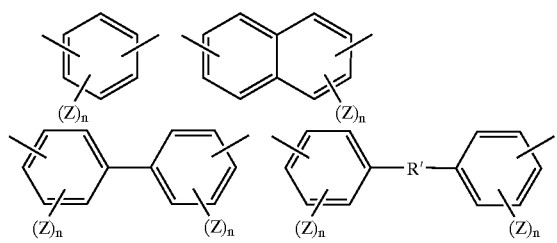

-continued

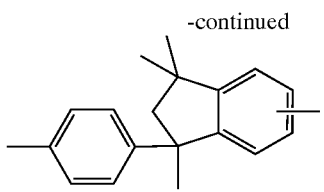

or a mixture thereof;

—R'— is

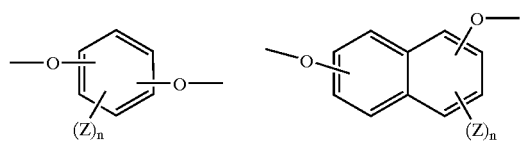

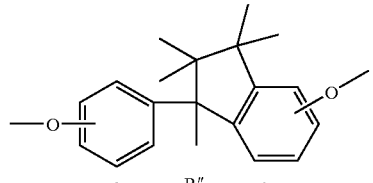

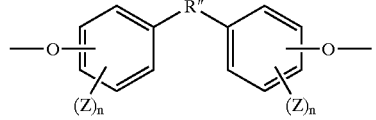

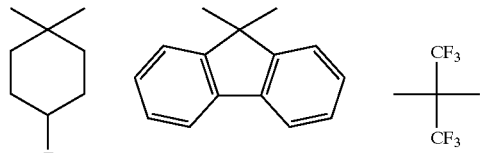

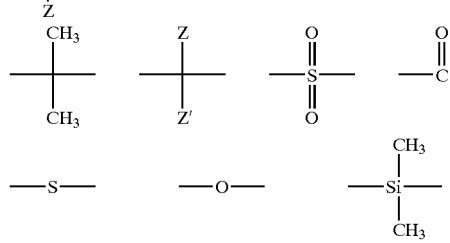

—R''— is

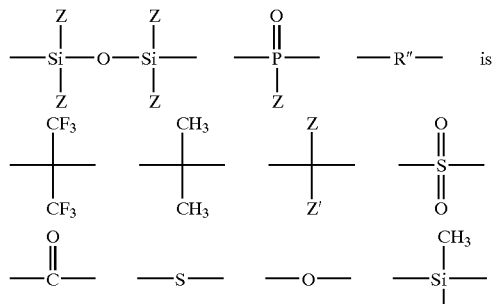

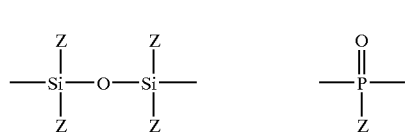

Z and Z' are:

—H, —CH$_3$, —CH$_2$CH$_3$, —CH$_2$CH$_2$CH$_3$, iso-propyl, iso-butyl, tert-butyl, —Br, —Cl, —F, —NO$_2$, —CN

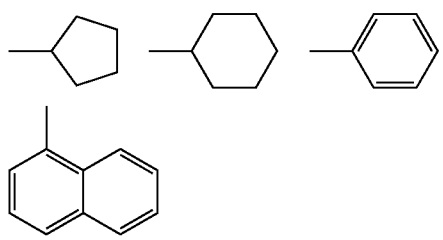
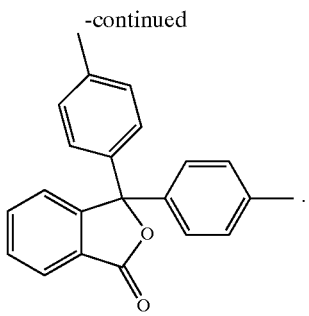
n = 0 - 4.
16. The polymer of claim 15 wherein said —Ar$_1$— is:
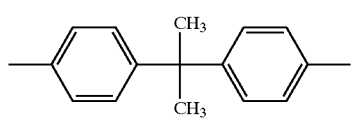
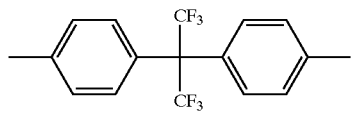
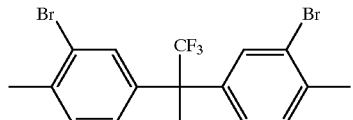
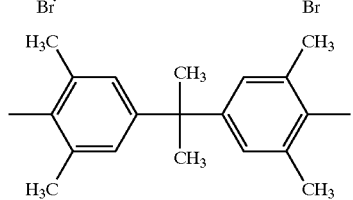
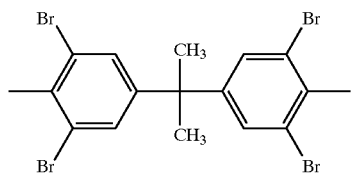
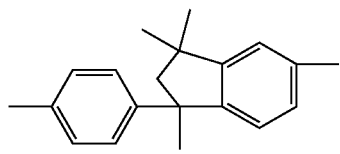
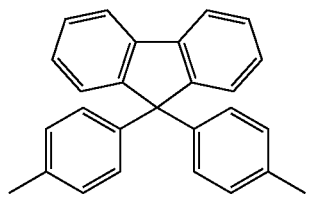
17. A poly(ester imide) comprised of chemically combined aromatic units of the following general formula:
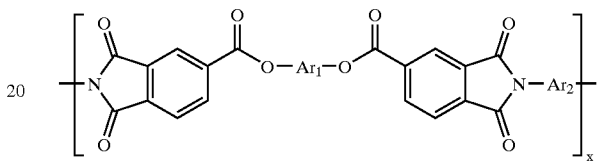
where —Ar$_1$— is a divalent aromatic organic radical having the following structure
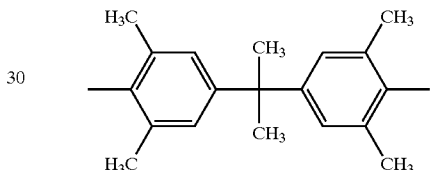
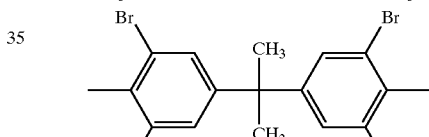
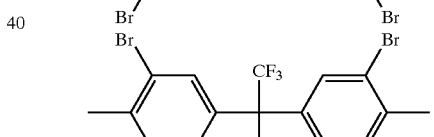
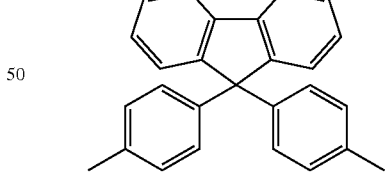
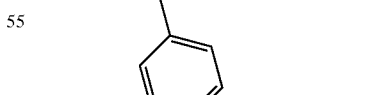
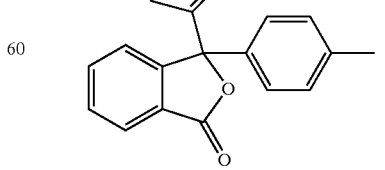

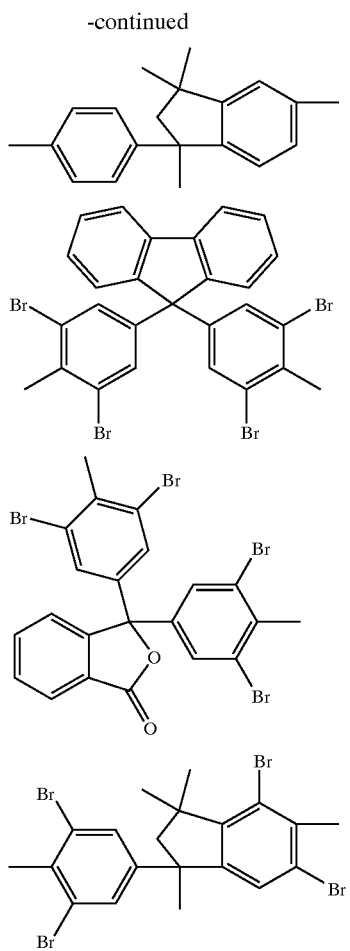
or a mixture thereof, and —$Ar_2$— is independently a divalent aromatic radical having the following structure:
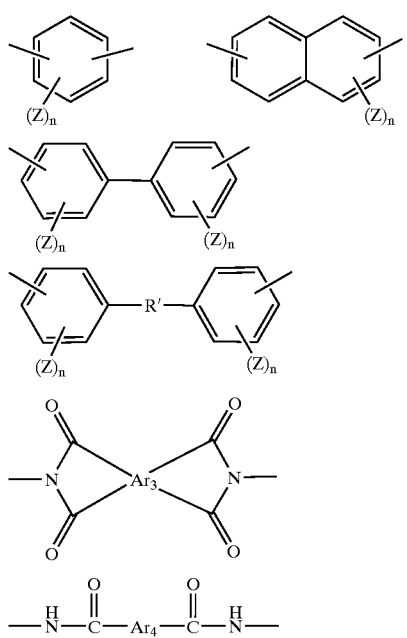
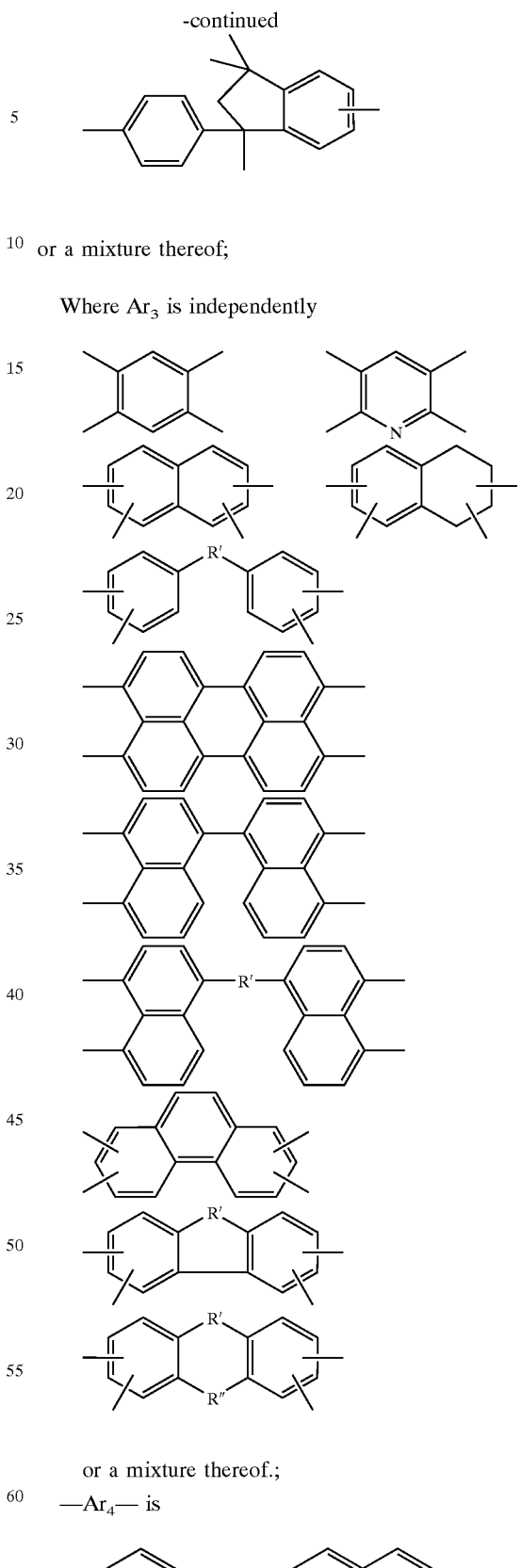
or a mixture thereof;
Where $Ar_3$ is independently
or a mixture thereof.;
—$Ar_4$— is
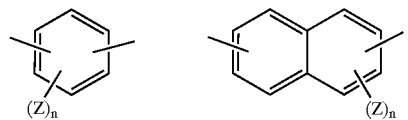

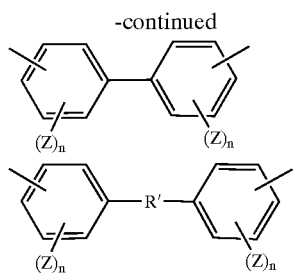

or a mixture thereof.

18. The poly(ester imide) of claim 17 where said —Ar$_2$— is

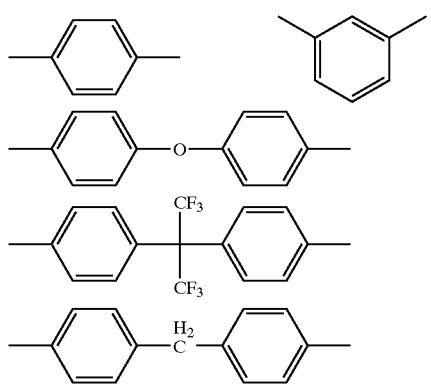

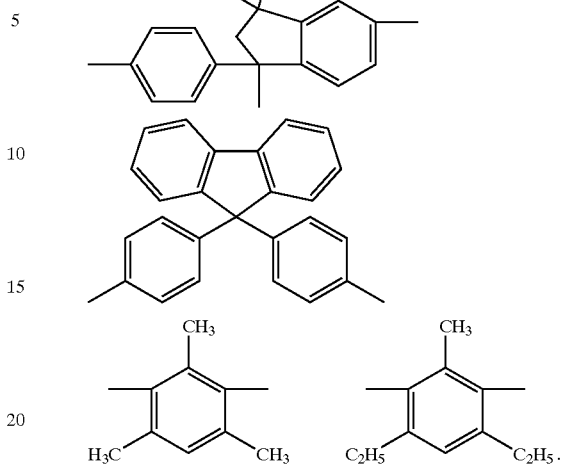

19. The polymer of claim 18 wherein said poly(ester imide) is formed by reacting tetrabromobisphenol A with one of the following dianilines: 4,4'-oxy-dianiline, 1,3-phenylenediamine, 1,4-phenylenediamine, 1,5-naphthalenediamine, 4,4'-hexafluorisopropylidene dianiline, 2,4,6-trimethyl-1,3-phenylene diamine, or a mixture thereof.

* * * * *